United States Patent [19]

Garcia et al.

[11] Patent Number: 5,359,725

[45] Date of Patent: Oct. 25, 1994

[54] METHOD OF CREATING CD-ROM IMAGE OF FILES OF DIFFERENT FORMAT WITH PROPER DIRECTORIES TO BE READ BY RESPECTIVE OPERATING SYSTEMS

[75] Inventors: Ben L. Garcia, Conyers, Ga.; Walter R. Klappert, Topanga; Edward Harmon, Burbank, both of Calif.

[73] Assignee: Time Warner Interactive Group, Inc., Burbank, Calif.

[21] Appl. No.: 776,661

[22] Filed: Oct. 15, 1991

[51] Int. Cl.⁵ ............................................. G06F 15/40
[52] U.S. Cl. ................................. 395/500; 364/236.2; 364/222.81; 364/965.5; 364/DIG. 1; 395/425; 395/600; 395/700
[58] Field of Search ................. 395/425, 500, 600, 700

[56] References Cited

U.S. PATENT DOCUMENTS

| | | | |
|---|---|---|---|
| 4,947,367 | 8/1990 | Chang et al. | 364/900 |
| 4,956,806 | 9/1990 | Crowe et al. | 364/900 |
| 5,029,125 | 7/1991 | Sciupac | 364/900 |
| 5,040,110 | 8/1991 | Miki et al. | 364/200 |
| 5,101,494 | 3/1992 | Bilski et al. | 395/700 |
| 5,119,465 | 6/1992 | Jack et al. | 395/500 |
| 5,121,492 | 6/1992 | Saville, III et al. | 395/500 |
| 5,202,983 | 4/1993 | Orita et al. | 395/600 |

OTHER PUBLICATIONS

Grunin, Lori; "NEC CD-ROM drive works with PCs, PS-2s, Macs" PC Magazine vol. 8, No. 4, p. 38 Feb. 28, 1989.

Primary Examiner—Parshotam S. Lall
Assistant Examiner—Ken S. Kim
Attorney, Agent, or Firm—Blakely, Sokoloff, Taylor & Zafman

[57] ABSTRACT

A method and apparatus for making a single CD-ROM disc useable on computers having unrelated operating systems or for multi-media platforms, specifically, wherein the two different operating systems are Hierarchical File System (HFS) used by Macintosh computers and MS-DOS which is the operating system used by IBM and compatible personal computers. The resulting compact disc is in ISO 9660 format which is a standard of the International Standards Organization which describes a logical format for organizing data on a Compact Disc Read Only Memory (CD-ROM). In this manner, it is possible to, for example, store two versions of a program on the same CD-ROM, one for execution on Macintosh computers and the other for execution on IBM PC and compatible computers. Thus, data which is to be stored on an ISO 9660 formatted disc can be sent from the producer or supplier of the data to a compact disc presser on a single magnetic medium such as a Bernoulli removable cartridge disk under a single operating system partition.

12 Claims, 3 Drawing Sheets

METHOD OF CREATING CD-ROM IMAGE OF FILES OF DIFFERENT FORMAT WITH PROPER DIRECTORIES TO BE READ BY RESPECTIVE OPERATING SYSTEMS

SUMMARY OF THE INVENTION

The invention is directed to a method and apparatus for making a single CD-ROM disc useable on computers having unrelated operating systems or for multimedia platforms, specifically, wherein the two different operating systems are Hierarchical File System (HFS) used by Macintosh computers and MS-DOS which is the operating system used by IBM and compatible personal computers. The resulting compact disc is in ISO 9660 format. The concepts of the present invention are intended to work with any operating system which supports the ISO 9660 format which is a standard of the International Standards Organization which describes a logical format for organizing data on a Compact Disc Read Only Memory (CD-ROM).

By use of the present invention, it is possible to, for example, store two versions of a program on the same CD-ROM, one for execution on Macintosh computers and the other for execution on IBM PC and compatible computers. By using the present invention, data which is to be stored on an ISO 9660 formatted disc can be sent from the producer or supplier of the data to a compact disc presser on a single magnetic medium such as a Bernoulli removable cartridge disk under a single operating system partition.

DETAILED DESCRIPTION OF THE INVENTION

Figure 3:
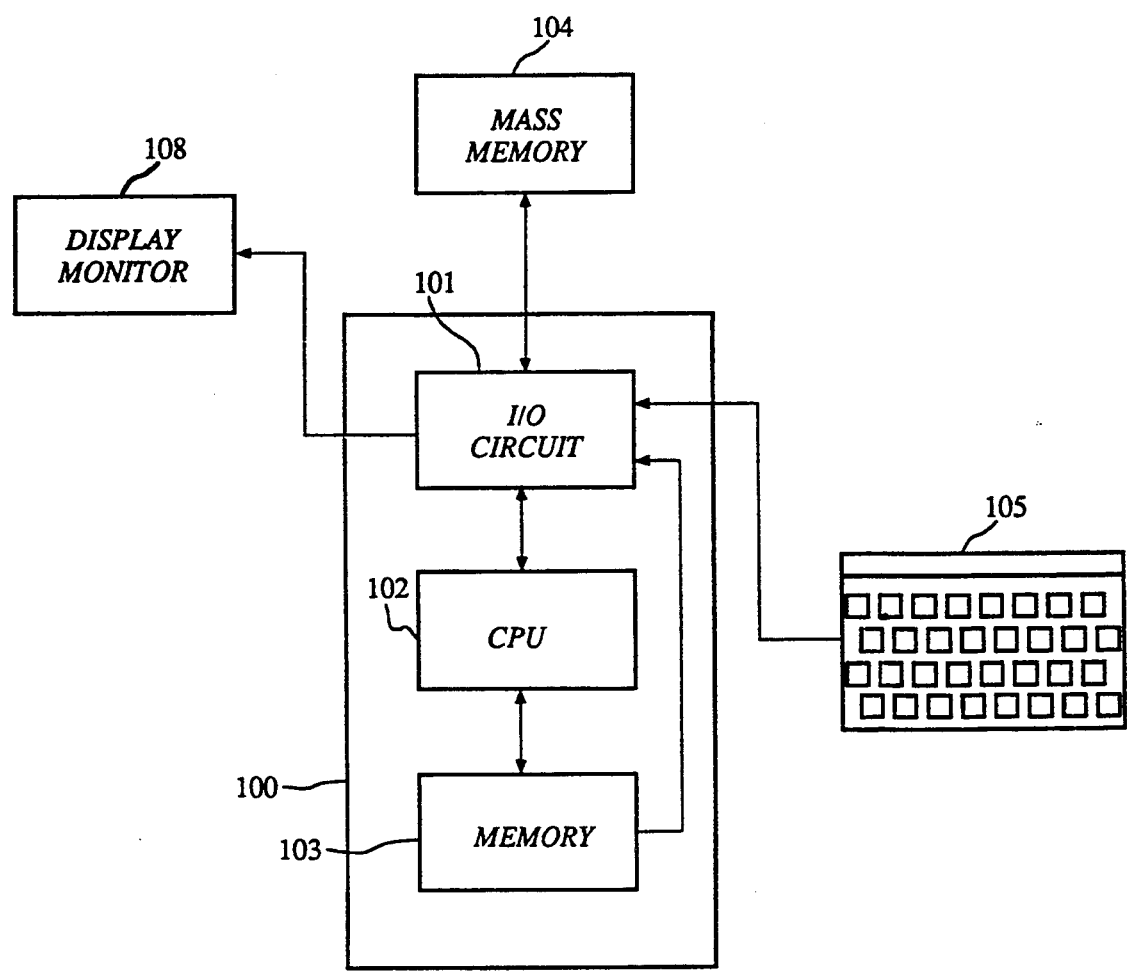
FIG. 3 illustrates a typical computer suitable for use in practising the present invention.

Referring first to FIG. 3, a typical computer is illustrated for carrying out the method and apparatus described further herein. As shown, there is a computer 100 which comprises three (3) major components. The first of these is the input/output (I/O) circuit 101 which is used to communicate information in appropriate instruction form to and from other parts of the computer 100. Also shown as part of the computer 100 is the central processing unit (CPU) 102 for executing the computer's instructions and a memory 103. Also illustrated is an input device 105, shown in a typical embodiment as a keyboard. A display monitor 108 is coupled to computer 100 via the I/O circuit 101. Finally, there is mass memory 104. The mass memory 104 may include hard disk magnetic storage devices, CD-ROMs, Bernoulli memory devices or other removable storage media as well as other well-known memory devices. Of course, computer 100 is just a typical example of a computer and many other configurations known in the art may be suitable for practising the present invention.

Figure 1:
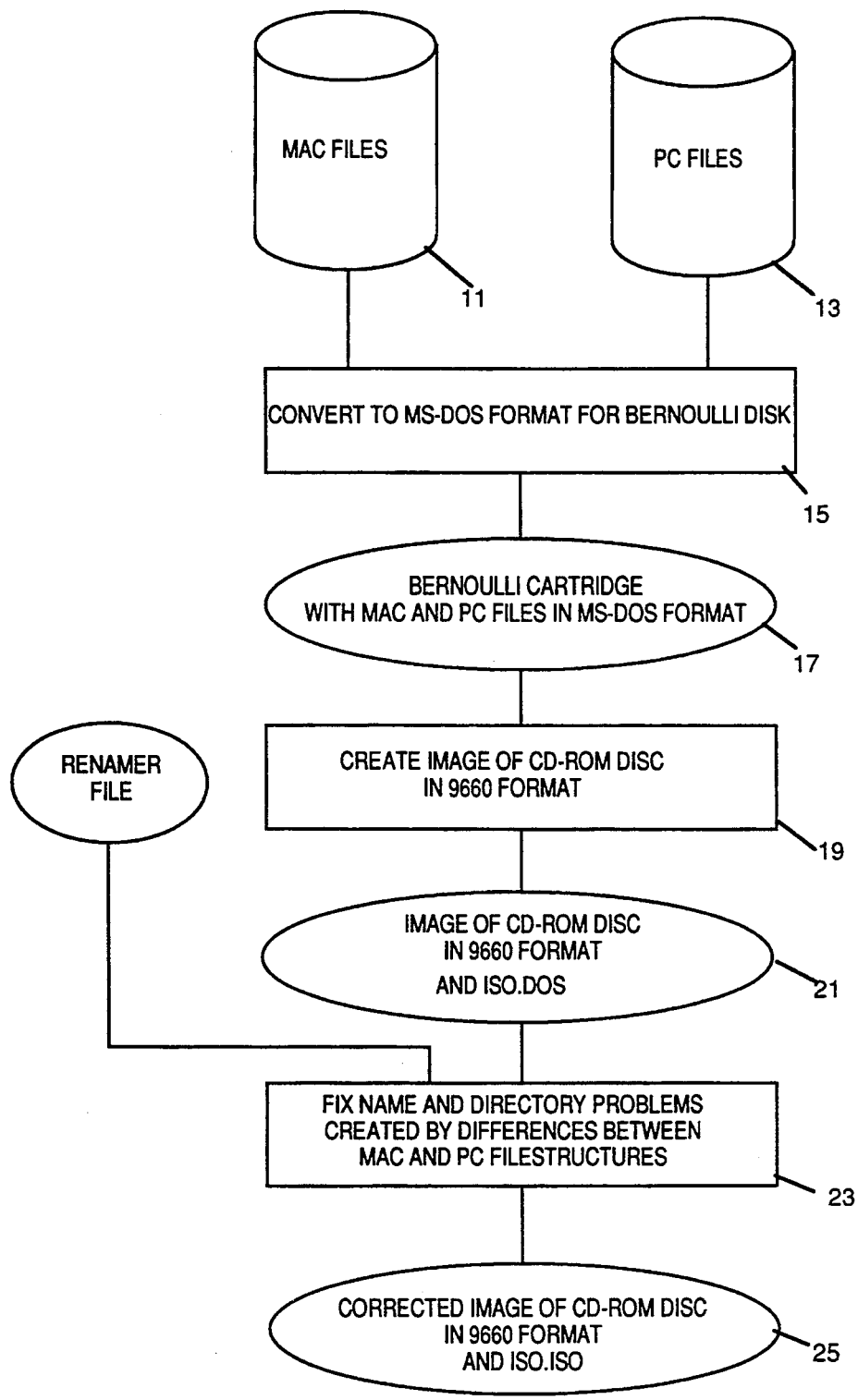
FIG. 1 is a diagramatic representation of the processing performed in conjunction with the present invention.

Referring to FIG. 1, data and programs which are desired to be placed onto the CD-ROM disc are stored in their native file formats, e.g., Macintosh files 11 and PC files 13 on storage media and systems associated with a computer system such as hard disk drives.

In the preferred embodiment, both the PC files and the Macintosh files are transferred to an MS-DOS formatted Bernoulli cartridge. This can be accomplished using commercially available products which convert HFS files to MS-DOS format (Block 15 in FIG. 1) and store the converted files on Bernoulli cartridge 17. A suitable software package which performs this function is known as Bernoulli file exchange available from Iomega of Roy, Utah.

The conversion simply copies the files in MS-DOS format from PC files 13 to Bernoulli cartridge 17. However, Macintosh HFS files which are physically one file may be logically comprised of a data fork and a resource fork or only a data fork or only a resource fork. When a Macintosh file having both a data fork and a resource fork is copied to an MS-DOS partition, in order to maintain the integrity of the Macintosh file, since MS-DOS does not have a structure analogous to the resource fork, it is necessary to create two physically distinct MS-DOS files, one for the data fork portion of the file and the other for the resource fork portion of the same Macintosh file. Both files have the same name, but the resource fork file is placed in a hidden directory called Resource.FRK at the same level as the data fork file.

Inasmuch as some Macintosh files comprise only resource forks, while others comprise only data forks, there may not be entries in the hidden Resource.FRK directory corresponding to a file in the data fork directory on Bernoulli cartridge 17. Conversely, in such situations, there may not be a data fork file which correspond to an entry in the hidden Resource.FRK directory on Bernoulli cartridge 17.

Additionally, placing an HFS directory and file on an ISO 9660 formatted compact disc with a name longer than eight characters (e.g., GUIDED_TOUR), and with the correct file owner (e.g., WILD) and type (e.g., STAK) is ordinarily not possible when an intermediate step in the processing requires the use of an MS-DOS partition since MS-DOS names are limited to 8 characters with an optional, up to 3 character, extension. Additionally, MS-DOS does not maintain file owner and type information.

The present invention resolves these problems by referencing an ASCII file called RENAMER having four columns of information. As shown in the following Table I, the first column is a list of filenames of all files to be processed for Macintosh compatibility on Bernoulli cartridge 17, with at least one trailing X added so that the name is eight characters long, the second column is a list of the eventual ISO file names, the third column is the HFS file type and owner concatenated together, and the fourth column is a list of letters B, D, or R, which refer to the data and resource fork parts of the file. B refers to a file having both a data and resource fork, D refers to a file having only a data fork and R refers to a file having only a resource fork.

TABLE I

| GUIDEDXX | GUIDED_TOUR | APPLWILD | B |
| HYPERCAX | HYPERCARD_2 | STAKWILD | R |
| PICTUREX | PICTURE_1 | PICTWILD | D |

The RENAMER file 18 is presently created by first ensuring that HFS files on media 11 are named in a manner which will not create problems when converted to legal MS-DOS names (e.g., two file names should be unique in eight characters or less and should not have imbedded spaces or special characters). It will be readily apparent to persons skilled in the art as to what names can be used without creating problems. The RENAMER file is created manually by, for example, a word processor producing an ASCII file with four columns as described above. The RENAMER file can of course be created by a routine which performs the aforesaid processing to create the RENAMER file.

To create the CD-ROM disc, it is first necessary to create a CD-ROM disc image in ISO 9660 format from the data on the Bernoulli cartridge (processing performed by block 19). The creation of the CD-ROM disc image which is also known as pre-mastering, can be performed using readily available commercial software such as Topix from Optical Media. The resulting image of the CD-ROM disc resides on a hard disk 21 which must have sufficient capacity to store the CD-ROM disc image which may be 600 megabytes or larger.

Although the CD-ROM can be pressed from the image on hard disk 21, programs on the resulting compact disc would not execute on a Macintosh computer since critical information contained in the resource fork is stored in a separate file in the hidden Resource.FRK directory. The present invention modifies directory records to resolve resource fork/data fork problems and the loss of complete file names, and owner and type information resulting from the temporary storage in an MS-DOS partition.

In essence, the present invention performs modifications to the CD-ROM image hard disk directory on disk 21 correcting problems which are not properly handled by the software 19 used by compact disc pressers to create CD-ROM masters.

Pre-mastering of the data on the Bernoulli cartridge 17 requires attention to the order of how files are placed in the CD-ROM image hard disk directory on disk 21. As noted above, during the conversion from HFS to MS-DOS format, both the resource and data fork files placed on the Bernoulli cartridge have the same name, but do not conflict with each other because they are in different directories (or folders). At the time of pre-mastering, the two files (data and resource) must be placed in the same directory (folder) level. However, since only a single file name is associated with the data fork and resource fork of an HFS file, a conflict would arise if resource fork and data fork files were created with the same name in the same level directory.

To resolve this conflict, each resource fork file name is renamed (using, for example, the MS-DOS RENAME command) to have the letter "X" appended to the name (e.g., old resource fork name ="REQUIEM", new resource fork name ="REQUIEMX"). If the original name is already eight characters long, then to maintain MS-DOS compatibility, the eighth (8th) character is forced to be the letter "X" (e.g. old resource fork name ="SUPERCAR", new resource fork name ="SUPERCAX"). Similarly, and in order to guarantee placement of the data fork file directory entry after the corresponding resource fork file directory entry in the ISO 9660 format directory record, the data fork file is renamed to have the letter "Y" appended to the name (e.g. old data fork name ="REQUIEM", new data fork name ="REQUIEMY"). If the original name is already eight characters long, then to maintain MS-DOS compatibility, the eight (8th) character is forced to be the letter "Y" (e g,. old data fork name ="SUPERCAR", new data fork name="SUPERCAY"). It should be noted that even though the directory entries for the resource and data fork files must be sequential and unseparated, the corresponding data of each resource and data fork file can physically reside anywhere on the CD-ROM disc.

Following the convention set forth above, all files on Bernoulli cartridge 17 are processed by program 19 and transferred to the CD-ROM image hard disk 21 on the pre-mastering workstation. Before program 19 is used to transfer data from cartridge 17 to disk 21, the data on cartridge 17 must be pre-processed. The files on cartridge 17 that exist in the hidden resource.FRK directory are moved into the visible data. FRK directory using a standard off-the-shelf program such as XTPRO from Executive Systems. The files in the resource. FRK directory are tagged and moved with the AUTOMATICALLY REPLACE EXISTING FILES switch of XTPRO set to NO so as to verify that none of the moved files will over-write the existing data.FRK directory files. Then, all the files in the data.FRK are sorted by name in ascending order using an off-the-shelf utility such as Norton Utilities from Peter Norton Corporation. Program 19 is used now to transfer files from disk 17 by prompting for the name of the pre-processed directory which now contains both resource and data files which have been sorted in alphabetical order. The processing performed by program 19 also builds the ISO 9660 directory record(s) when the resource and data files are copied from Bernoulli cartridge 17 to CD-ROM image hard disk 21.

After all files are transferred to CD-ROM image hard disk 21, the virtual CD-ROM directory block(s) from the CD-ROM image hard disk are written to a conventional MS-DOS file (ISO.DOS) which may be on disk 21 or a separate MS-DOS hard disk. The CD-ROM directory block(s) are transferred to ISO.DOS using a program from Optical Media called VCD2FILE.EXE. This program allows the simple transfer of virtual CD blocks from disk 21 to a file on any destination MS-DOS disk drive. The user prompts the program with name of the file to create. The resultant file will have the contents of the virtual CD-ROM directory blocks specified by the user. The program VCD2FILE.EXE has no knowledge of directory blocks or any other types of blocks, so the user is responsible for identifying the beginning and ending locations on the virtual CD-ROM disk 21 that contain valid directory block(s). The actual locations for the directory blocks are specified by the user at the time of transfer from disk 17 to disk 21 by use of program 19. The directory blocks form the ISO.-DOS file which is a directory file that contains the names and location of the HFS files to be converted.

As noted above, the ISO.DOS file contains resource fork and data fork file names. If a resource fork file does not have a data fork file part, then only the resource fork file name will be present in the ISO.DOS file. If a data fork file does not have a resource fork file part, then only the data fork file name will be present in the ISO.DOS file.

However, if the data fork file does have a resource fork file part, then both file names will be present in the ISO.DOS file.

The resource fork file name appears first and is immediately followed by the data fork file name.

Each file name (data or resource) in the ISO.DOS file is referred to as an entry. Therefore, in the ISO.DOS file, the resource fork file name is the first entry and is also called the associated entry, so its associated bit is set by the ISO.PC program. The next entry is the data fork file name and is not associated with any other entries, so its associated bit is cleared by the ISO.PC program. For data files which have no resource file and for resource files with no data files, the associated bit is always cleared by the ISO.PC program.

The ISO.DOS file is processed using a computer program 23 which forms the present invention (attached hereto as Appendix 1) that customizes the data of the directory records using the RENAMER file and writes the resultant data creating a new file (ISO.ISO).

In particular, the program opens the RENAMER file which is read and processed. As noted above, RENAMER contains DOS names, HFS names, and type and owner, and the file fork indicator letter.

The file ISO.DOS is processed by looking for a file name that matches one of the file names contained in the RENAMER file. When a match is found, the ISO name is inserted over the DOS name. Padding is added at the end of each file name, the directory record's length is adjusted relative to the ISO name inserted, and all lengths are updated (the ISO directory record is a variable length record). Next the type and owner information is inserted and again the length values are adjusted. This process is repeated on the next entry if the current entry is an associated entry. Then the associated bit of the first entry is set and the corresponding bit of the next entry is cleared.

The above process is repeated for each file name match between the ISO.DOS file and the RENAMER file.

The customization makes the changes needed to form a proper Macintosh resource and data fork in the ISO 9660 format directory record, with both members of the pair having the same name.

The file name for each file pair may also be changed to a name that is not restricted to MS-DOS requirements (that is, greater than 8 characters plus a 3 character extension), and may or may not end with ".;(version#)".

The ISO.ISO file is then rewritten back to the CD-ROM image hard disk 21 shown in FIG. 1 as the corrected image of CD-ROM disc in ISO 9660 format on hard disk 25 so that it overwrites the data originally used to make ISO.DOS. This step essentially replaced the old directory records with new modified ones that still point to the correct data somewhere else on the CD-ROM image hard disk 25.

Figure 2:
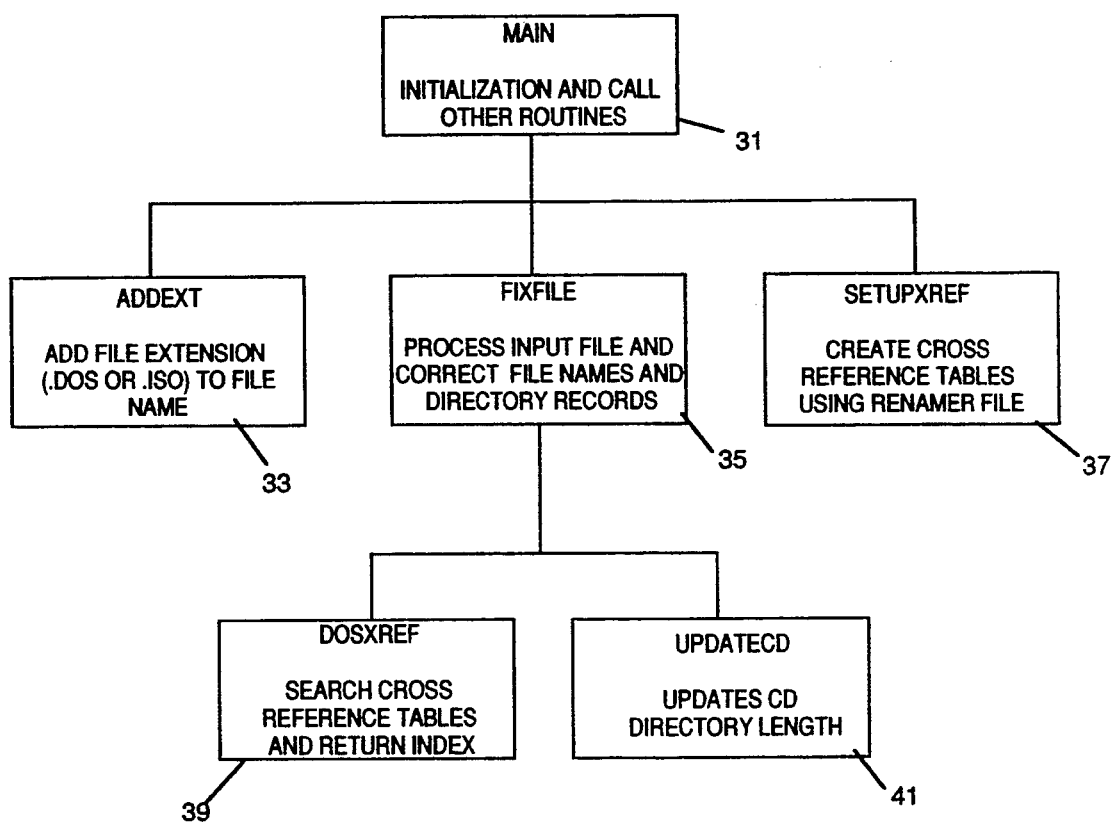
FIG. 2 is a hierarchical diagram of the processing performed by block 23 of FIG. 1.

FIG. 2 is a hierarchical diagram of the computer and routines (main 31, addext 33, fixfile 35, setupxref 37, dosxref 39 and updatecd 41) utilized by the present invention. The following is a description of each of the routines and the parameters passed to or from each routine.

main ([a, [b]])

If no command line parameters are present, Help information is printed to the screen.

Parameter (a) is the name of the "source" file (with or without a .dos extension) and is required.

Parameter (b) is the name of the "resultant" file (with or without an .iso extension) and is optional.

The main() routine tests for the presence of parameter(s) and prints Help information if no parameters are present. If parameters are present, main() (i) creates and adjusts file names using defaults and overrides; (ii) allocates the entire working memory needed for the source and resultant file; (iii) opens the source file and the RENAMER file, reads the contents of the "source" file, fills any extra buffer space with 00's and closes the source file; (iv) calls "setxref" to read in the renaming tables from the RENAMER file and closes the RENAMER file; (v) calls the "fixfile" routine to make the changes to the directory records as described herein; (vi) opens the "resultant" file and writes the same amount of data as read from the "source" file from the working memory area and closes the "resultant" file; and (vii) frees the working memory, prints statistics and exits.

addext (a,b)

Parameter (a) is a file name and parameter (b) is a file extension. If the file name has no ".", the file extension is added to the file name, otherwise no changes are made.

setupxref()

The routine setupxref() has no parameters. The routine reads the RENAMER file and puts the four entries into four arrays as follows, where i ranges from 1 to 500:

xref[i].old $\leq \rightarrow$ the source's old ".dos" name.

xref[i].new $\leq \rightarrow$ the resultant's new ".iso" name.

sys_type[i] $\leq \rightarrow$ the system area TYPE and CREATOR.

file-type[i] = $\rightarrow$ the file fork indicator letter fixfile()

The routine fixfile() has no parameters. Zeroes out statistics.

During a first pass, the routine loops through the data from the "source file" in the working memory which contains directory records according to the ISO 9660 standard (see Table II) to find all occurrences of ISO directories (based on the directory bit in byte location 26) and stores the number of bytes needed for all the directory records of all of the files contained in each directory in a table called dir_end.

During a second pass, (i) if a length 0 is found for a directory record, the program guarantees that no records will span a 2K byte boundary (ISO requirement) and no 00's are left between records in a single 2K byte block; (ii) it skips records which describe actual ISO directories (folders); (iii) it makes validity checks on length for overall filesize and directory record entry, and if invalid, returns with an error and terminates; (iv) it determines if filenames for the current entry and the next entry match, then checks that the respective filename lengths match as well; (v) if both match, and the dosxref function finds the new name, the user is informed, and the new name is moved into both entry positions, adjusted for the new size of the names. Various special cases are handled like the end of a 2K byte buffer—if the dosxref function does not return a match, the entry is not modified; (vi) handles file names of less than 7 characters and 00 padding; (vii) deals with the Macintosh system area -TYPE and CREATOR from Table I are concatenated after the sequence <42><41><06> and followed with <01><00> (or <21><00> if the type is appl) and with another <00> if needed to make the directory record even; (viii) if required, it pushes all data starting with the next ISO directory record to the next 2048 byte boundary, and pads the end with 00's; and (ix) handles the change of filenames and system area for, data only (D), and resource only (R) files.

TABLE II
ISO 9660 DIRECTORY RECORD LAYOUT (RELEVANT FIELDS)

| FIELD BYTE LOCATION | |
|---|---|
| 1 | Length of current directory record (must be even) |
| 2–10 | (not relevant) |
| 11–18 | If this record describes a "directory" (or "folder") this is the length of the records for the file within this directory. |
| 19–25 | (not relevant) |
| 26 | File Flags |
| 27–32 | (not relevant) |
| 33 | Length of the file name (length) |
| 34–(33+ length) | File name |
| 34+ length | System Area (ending in an extra 00 byte only if needed to make the whole directory record an even number of bytes) | updatecd (a)

Parameter (a) is an unsigned integer which represents the position of the compact disc directory length. The routine updates the compact disk directory length by adding 1 to the compact disc block count if more space is required. This allocates additional space in 2,048 byte increments. (However, this extension of the directory records will fit in the ISO image only if enough directory record space was reserved for growth during the premastering process.)

dosxref (a,b,c)

Parameter (a) is the DOS input file name, parameter (b) is the HFS output file name,and parameter (c) is the index of the three arrays created by setupxref(). The routine finds the DOS name in the xref[i].old array and copies the ISO name from the xref[i].new array and returns the index.

A source code listing of the routines main 31, addext 33, fixfile 35, setupxref 37, dosxref 39 and updatecd 41 are attached hereto as Appendix 1.

APPENDIX 1

```c
#include <stdlib.h>
#include <stdio.h>
#include <dos.h>
#include <string.h>
#include <ctype.h>
#include <fcntl.h>
#include <sys\types.h>
#include <sys\stat.h>
#include <malloc.h>
include <io.h> define true -1
define false 0 define FILE_BUF_SIZE 64000   /* 0 to 59392 */
define RENAMER_BUF_SIZE 500
define DIR_ARRAY_SIZE 32     /* 29 * 2048 ( ONE CD BLOCK ) = 59392 */ unsigned int filesize;
unsigned int filecount;
unsigned int dir_end[DIR_ARRAY_SIZE];

int last_dir_cnt;
int blocksize;

int     dir_entry, gen_entry;
```

```
int     pa.._entry, pair_entry_chd, pair_entry_passed;
int     sng_entry, sng_entry_chd, sng_entry_passed;

/* int even;     used to determine if new file name is odd or even */
char    *filebuf;
char    *buffer;

char sysarea[14] =
            { 0X42, 0X41, 0X06, 'S','T','A','K','W','I','L','D',
                    0X01, 0X00, 0X00 };
char nullchar[1] = { 0x00 };

FILE    *xreffile;
struct {
        char    old[20];
        char    new[33];
} xref[RENAMER_BUF_SIZE];

char sys_type[RENAMER_BUF_SIZE][33];
char file_type[RENAMER_BUF_SIZE][33];
int     xreflines;

/************************************************************/
/* main                                                    */
/************************************************************/
main(int argc,char *argv[])
{
        int i,count;
    unsigned int size_of_buffer;
        int source,result;
        char sourcename[20],resultname[20];

if (argc == 1) {
        printf("\n\"iso\" syntax :\n");
        printf("        iso <sourcename> <resultname>\n");
        printf("            where  <sourcename> = name of source file\n");
        printf("                   <resultname> = name of result file\n");
        printf("            if file names extensions are not included,\n");
        printf("               \".dos\" will be used for the source file, and\n");
```

```c
            printf("              \".iso\" will be used for the report file\n");
            printf("              if no result file name is given, it is assumed to be\n");
            printf("              the same as the source file name, with extension \".iso\"\n");
            printf("              Also, existence of file called 'renamer' assumed\n");
            exit(1);
    }
    strcpy(sourcename,argv[1]);

/* Format name of output file... */
    if (argc == 2) {
            strcpy(resultname,sourcename);
            *strchr(resultname,'.') = '\0';
    }
    else
            strcpy(resultname,argv[2]);

addext(sourcename,".DOS");
    addext(resultname,".ISO");

/* Allocate file buffers, open source file and read contents... */ size_of_buffer = FILE_BUF_SIZE;
    filebuf = ( char * ) halloc(size_of_buffer,2);
    if (filebuf == NULL) {
            printf("\nNot enough memory for file buffer\n");
            exit(2);
    } buffer = ( char *) malloc(2048);
    if (buffer == NULL) {
        printf("\nNot enough memory for buffer file\n");
        exit(2);
    } source = open(sourcename,O_BINARY | O_RDONLY);
    xreffile = fopen("renamer\0","r");
    if (source == -1 || xreffile == NULL) {
            if (source == -1)
```

```c
                printf("\nError opening source file %s\n",sourcename);
    else
                printf("\nError opening file 'renamer'\n");
        hfree(filebuf);
        free(buffer);
        exit(3);
} filesize = 0;
blocksize = 0;
do {
        blocksize = read(source,buffer,2048);
    for (i=0;i<blocksize;i++) {
                filebuf[filesize+i] = buffer[i];
        }
        filesize = filesize + blocksize;
} while (blocksize > 0);

if (filesize == FILE_BUF_SIZE) {
        printf("\nSource file %s too large (must be less than %d bytes)\n",
        sourcename,FILE_BUF_SIZE);
        hfree(filebuf);
        free(buffer);
        exit(3);
}

/* clear out buffer after use. */
for (i=0;i<2048;i++){
    buffer[i] = 0x00;
} close(source);

/* Setup the xref array by reading and formatting 'renamer' */
setupxref();
fclose(xreffile);

/* Go re-format the directory... */
fixfile();
```

```c
if (( result = open(resultname,O_CREAT | O_BINARY | O_WRONLY | O_TRUNC,
                   S_IREAD | S_IWRITE )) == -1){
    printf("\nError opening result file %s\n",resultname);
    hfree(filebuf);
    free(buffer);
    exit(4);
} filecount = 0;
do {
    if( (filecount + 2048) <= filesize ) {
            blocksize = 2048;
    }
    else {
        blocksize = filesize - filecount;
    }
    for(i=0;i<blocksize;i++){
            buffer[i] = filebuf[filecount + i];
    }
    count = write(result,buffer,blocksize);
    filecount = filecount + count;
}while(filecount < filesize);

close(result);

hfree(filebuf);
free(buffer);

printf("\ndirectory entries = %d\n",dir_entry);
printf("total entries found = %d\n",gen_entry);
printf("pair entries found = %d\n",pair_entry);
printf("pair entries changed = %d\n",pair_entry_chd);
printf("pair entries passed = %d\n",pair_entry_passed);
    printf("single entries found = %d\n",sng_entry);
    printf("single entries changed = %d\n",sng_entry_chd);
    printf("single entries passed = %d\n",sng_entry_passed);

exit(0);
}
```

/****************************************************************/
/* setupxref() - Reads and processed the file 'renamer' for cross-referencing */
/****************************************************************/

```c
setupxref()
/* Setup the xref matrix by reading the xref file and formatting into memory */
{
        char curline[RENAMER_BUF_SIZE];
        char dos_name[33], mac_name[33], area_type[33], type[33];
        int       count;
        int    stln;
        int    i,j;

i = 0;
while (NULL != fgets(curline, RENAMER_BUF_SIZE, xreffile)) {
        count = sscanf(curline, " %[^>]> %[^>]> %[^>]> %[^\r\n]",
            dos_name, mac_name, area_type, type);
        if (strlen(dos_name) > 20 || count != 4) {
                if (strlen(dos_name) > 20) fprintf(stderr, "DOS name %s is too long!\n", dos_name);
                else fprintf(stderr, "Can't understand input line %s!\n", curline);
                free(filebuf);
                exit(4);
        }
        sscanf(dos_name, "%s", xref[i].old); /* Remove trailing white-space*/
        sscanf(mac_name, "%s", xref[i].new);
        strcpy(sys_type[i], area_type);
        strcpy(file_type[i], type);
        if (++i > RENAMER_BUF_SIZE) exit(5);
}
xreflines = i;
}
```

/****************************************************************/
/* doxref() - looks up 'dosname' in xref matrix & maps it to mac equivalent */
/****************************************************************/

```c
char doxref(char *dosname, char *macname, int *index)
{
        int    i;
```

```
for (i=0; i < xreflines; i++)
        if (strcmp(dosname, xref[i].old) == 0) {
                strcpy(macname, xref[i].new);
                *index = i;
                return true;
        }
*index = -1;
return false;
}

/****************************************************************/
/* updatecd() - updates the cd directory length by adding 1 to cd block count */
/****************************************************************/
void updatecd( unsigned int *cd_position )
{ unsigned int i,j,k;

i = *cd_position;

/* calculate new value to dir_end and CD block */
        j = (filebuf[i+16] * 0x100) + filebuf[i+17];
        j = j + 2048;
        k = j / 0x100;
        j = j - ( k * 0x100);
        /* if directory entry and directory length > 0      */
        /*   update CD block length      */
        if( ( ( filebuf[i+25] & 0x02) == 0x02 ) && ( filebuf[i] > 0 ) ) {
                filebuf[i+10] = j;
                filebuf[i+11] = k;
                filebuf[i+12] = filebuf[i+13] = 0x00;
                filebuf[i+14] = filebuf[i+15] = 0x00;
                filebuf[i+16] = k;
                filebuf[i+17] = j;
                dir_end[last_dir_cnt] = dir_end[last_dir_cnt] + 0x800;
        }
        /* if associated directory exist, update it. */
        /* filebuf[ position + entry length + byte count */
        if( ( ( filebuf[i + filebuf[i] + 25] & 0x02) == 0x02 )
                        && ( filebuf[i + filebuf[i]] > 0 ) ) {
```

```
filebuf[i + filebuf[i] + 10] = j;
filebuf[i + filebuf[i] + 11] = k;
filebuf[i + filebuf[i] + 12] = 0x00;
filebuf[i + filebuf[i] + 13] = 0x00;
filebuf[i + filebuf[i] + 14] = 0x00;
filebuf[i + filebuf[i] + 15] = 0x00;
            filebuf[i + filebuf[i] + 16] = k;
            filebuf[i + filebuf[i] + 17] = j;
    }
}

/************************************************************/
/* addext */
/************************************************************/
addext(char *filename, char *ext)
{
 /* strupr(filename);  */
 if (strchr(filename,'.') == NULL)
   strcat(filename,ext);
}

/************************************************************/
/* fixfile locates which file names will be changed, inserts the new   */
/*         name, inserts the system area data and adjusts the rest    */
/*         of the file.                                                */
/************************************************************/ fixfile()

{
  unsigned int fileindex,i,j,k;
  unsigned int padding_length;
  int l,m;
  int match, length, added_length;
  int    dif;
   char curtext[80],nxttext[80];
   char *curptr,*nxtptr,*sysptr,*difptr;
  unsigned int  lastchunk; /* memcpy statement uses an integer variable */
  int sysSize;
   int index, last_dir, dir_array;
```

```
unsigned int fileindex_start;
char newname[33];
unsigned int cur_dir;

/* clear variables used to track entries */
dir_entry = 0;
gen_entry = 0;
pair_entry = 0;
pair_entry_chd = 0;
pair_entry_passed = 0;
sng_entry = 0;
sng_entry_chd = 0;
sng_entry_passed = 0;

/* clear out directory end array */
for (l=1;l<=DIR_ARRAY_SIZE;l++){
dir_end[l] = 0;

}

/* determine end of each directory */
  m = 0;
  fileindex = 0;
  while(fileindex <= filesize){
      length = filebuf[fileindex];
/* find new way of knowing a directory starting point    */
/* first directory tells its size, then go to next point if there */
      if( ( ( filebuf[fileindex+25] & 0x02 ) == 0x02 ) &&
              ( length > 0 ) ){
          m = m + 1;
          dir_end[m] = fileindex + (filebuf[fileindex + 16] * 256) +
                          (filebuf[fileindex + 17]);
          fileindex = dir_end[m];
      }
    else fileindex = fileindex + 1;
  } last_dir = -1;
  for(i=1;i<=DIR_ARRAY_SIZE;i++){
    if ( (dir_end[i] == 0) && (last_dir < 0) ){
        last_dir = i-1;
```

```
        }
}

/* Set pointer to current entry-set to beg. of file */
fileindex = 0;

/* loop for each directory */
 for (last_dir_cnt=1;last_dir_cnt<=last_dir;last_dir_cnt++){

/* padding_length is a variable used to determine is there is */
/* any padding between entries. */
/* set padding_length to zero at start of directory */
  padding_length = 0;
/* Loop until we reach end of current directory...*/
  while ( fileindex <= dir_end[last_dir_cnt] ) {
    /* Get length of current entry & see if we're done...*/
      length = filebuf[fileindex];
      if (length == 0){
              /* if length is equal to zero, no current entry, */
              /* so add one and check the next byte until end of file */
            /* add one to padding_length because there may be some */
            /* padding added at the 2048 byte boundry */
                /* continue will send control to outer while loop  */
                fileindex = fileindex + 1;
          padding_length = padding_length + 1;
                continue;
      }

/* if padding_length is greater than zero, must have found padding */
        /* between two entries  */
        /* remove padding and move remaining bytes up. */
        if (padding_length > 0){
                dif = padding_length * (-1);
                difptr = &filebuf[fileindex];
                lastchunk = (unsigned int) (&filebuf[filesize]);
                _fmemmove(difptr+dif, difptr, lastchunk);
                /* adjust fileindex to new location */
                fileindex = fileindex + dif;
                padding_length = 0;
                /* insert 0x00 at the end of the file */
```

```
            j = filesize + 1 + dif;
                for (i=j;i<=filesize;i++){
                    filebuf[i] = 0x00;
                }
        } if ((filebuf[fileindex + 25] & 0x02) == 2){
                /* if directory record bit 2 of byte 26 is set     */
                /* ( file flags ) means that directory record    */
                /* identifies a directory and should be skipped */
                fileindex = fileindex + length;
                /* increment directory entry counter */
                dir_entry = dir_entry + 1;
                continue;
        } if ( (fileindex + length) >= filesize){
                return false;
        }

/* Make sure existing dir length is even &   */
        /* it starts on an even boundary           */
        if ((length % 2 != 0) || (fileindex % 2 != 0)){
                fprintf(stderr,"* Bad directory length (must be even)\n");
                return false;
        }

/* find where the next entry is. added_length is used to account */
        /* for padding before boundries. */
        added_length = 0;
        if( ( filebuf[fileindex] != filebuf[fileindex + length] ) &&
            ( filebuf[fileindex + length] == 0x00 ) ){
                do {
                    if ( filebuf[fileindex + length + added_length]
                                  == 0x00) {
                        added_length = added_length + 1;
                    }
                } while ( (filebuf[fileindex] !=
                    filebuf[fileindex + length + added_length]) &&
                    ( filebuf[fileindex + length + added_length] == 0x00) &&
```

```
                ( added_length < 256) );
}
/* if the two entry length don't match reset added_length */
if ( filebuf[fileindex] !=
        filebuf[fileindex + length + added_length] ){
                added_length = 0;
}

/* I'm assuming that the padding is no longer needed at this point */
    /* because each previous entry has had its name changed and    */
    /* system area added. Meaming that its location is no longer on */
    /* a boundry */
    /* So move the entry up the added_length     */
    if ( added_length > 0 ) {
            dif = added_length * (-1);
            difptr = &filebuf[fileindex + length + added_length];
            lastchunk = (unsigned int) (&filebuf[filesize]);
            _fmemmove(difptr+dif, difptr, lastchunk);
            added_length = 0;
            /* insert 0x00 at the end of the file */
            j = filesize + 1 + dif;
            for(i=j;i<=filesize;i++){
                    filebuf[i] = 0x00;
            }
    }

/* Get pointers to filenames for both entries &    */
    /* see if 1st 7 chars. match              */
curptr = &filebuf[fileindex + 33];
nxtptr = &filebuf[fileindex + length + added_length + 33];
match = true;
for (i = 0; i < filebuf[fileindex + 32] &&
                            i < 7; i++,curptr++,nxtptr++)
  if ((*nxtptr) != (*curptr)) {
     match = false;
}

/* general entry found, increment counter */
    gen_entry = gen_entry + 1;
```

```c
/* Also verify that filename lengths match as well */
if (i > 0 && match &&
    filebuf[fileindex + 32] ==
        filebuf[fileindex + length + added_length + 32]) {

/* Extract the filenames so we can notify user about the match */
    curptr = &filebuf[fileindex + 33];
    nxtptr = &filebuf[fileindex + length + added_length + 33];
    for (i = 0; i < filebuf[fileindex + 32]; i++,curptr++,nxtptr++) {
        curtext[i] = *curptr;
        nxttext[i] = *nxtptr;
        *nxtptr = curtext[i];
    }
    curtext[i] = '\0';
    nxttext[i] = '\0';

/* pair of entries found, increment pair counter */
    pair_entry = pair_entry + 1;

/* Cross reference the old names with the 'renamer' */
    /* file and substitute                              */
    /* the result.                                      */
    /*      printf("curtext= %s",curtext);              */ if (doxref(&curtext[0], newname, &index)) {
        printf("Match found : \"%s\" and \"%s\"\n",curtext,newname);

/* pair found and name is in renamer, so increment */
        /* pair_entry_chd                                  */
        pair_entry_chd = pair_entry_chd + 1;

/* cur_dir is the value of the next cd border (2048, 4096..) */
        for(cur_dir=0x800;cur_dir<=fileindex;cur_dir=cur_dir+0x800);
            /* get difference of old name and new name */
        dif = strlen(newname) - filebuf[fileindex+32];
        /* check if new file entry will extend over the CD border */
        /* dif = dos-mac name, 14 is system size and 1 is for even */
        /* file name lengths                                      */
        if((fileindex+length+dif+14+1)>=(cur_dir-1)){
            dif = cur_dir - fileindex;
```

```
        difptr = &filebuf[fileindex];
        lastchunk =
             ( unsigned int) (&filebuf[filesize-dif]-difptr);
        _fmemmove(difptr+dif,difptr,lastchunk);
        /* padding end of previous directory with 0x00 */
for ( i=fileindex;i<cur_dir;i++){
    filebuf[i] = 0x00;
}
/* update the new fileindex value */
fileindex = cur_dir;

/* Since first file went over the boundry and was moved */
        /* down the second file is added_length from first should */
        /* be moved up          */
        if ( added_length > 0 ){
                dif = added_length * ( -1 );
                difptr = &filebuf[fileindex + length + added_length];
                lastchunk = (unsigned int) (&filebuf[filesize]);
                _fmemmove(difptr+dif, difptr, lastchunk);
                added_length = 0;
                /* insert 0x00 at the end of the file */
                j = filesize + 1 + dif;
                for(i=j;i<=filesize;i++){
                        filebuf[i] = 0x00;
                }
        }
/* if your at the last CD block and isopc needs more space */
        /* update all values to allow isopc ot continue into the */
        /* the next cd block                                     */
/* what if dir_end[?] is not equal to cur_dir  */
if(dir_end[last_dir_cnt] == cur_dir){
        if(last_dir_cnt>1){
                        i = dir_end[last_dir_cnt -1];
                }
                /* what if last_dir_cnt is equal to 1    */
                else{
                        i = 0x00;
                }
                updatecd ( &i );
```

```
        } /* end if */
    } /* end if ((fileindex + length.... */
/*    */

/*    */
        /* if old file name is even, there will be a trailing 0x00 */
        /* leave the trailing 0x00 and adjust the length of the   */
        /* filename so that the 0x00 becomes part of the file name. */
        if( (filebuf[fileindex + 32] % 2) == 0 ){
            filebuf[fileindex + 32] = filebuf[fileindex + 32] + 1;
            filebuf[fileindex + 32 + length + added_length] =
                    filebuf[fileindex + 32 + length + added_length] + 1;
        }

/* insert new file name    */
        dif = strlen(newname) - filebuf[fileindex + 32];
        if (dif > 0) {
            difptr = &filebuf[fileindex + 33 + dif];
              /* Ptr to excess */
        lastchunk = (unsigned int) (&filebuf[filesize - dif] -
                                                        difptr);
        _fmemmove(difptr + dif, difptr, lastchunk);
        memcpy(&filebuf[fileindex + 33],
        newname, strlen(newname));
        length += dif;

/* And, for the companion entry... */
        difptr = &filebuf[fileindex + length + added_length
                                            + 33 + dif];
    _fmemmove(difptr + dif, difptr, lastchunk);
    memcpy(&filebuf[fileindex + length + added_length + 33],
    newname, strlen(newname));

/* Now update all length bytes to reflect added data */
    filebuf[fileindex] += dif;
    filebuf[fileindex + length + added_length] += dif;
    filebuf[fileindex + 32] =
    filebuf[fileindex + length + added_length + 32] =
                            strlen(newname);

}
```

/* This new modification allows a file name to be less than */
/* seven characters but greater than or equal to one character. */

```
    else if( (dif>= -15) && (dif<=0) ){
    /* calculate what data to move up    */
        difptr = &filebuf[fileindex] + filebuf[fileindex];
        lastchunk = (unsigned int) (&filebuf[filesize]);
    /* move the data up.        */
        _fmemmove(difptr+dif, difptr, lastchunk);
    /* copy the new file name into place        */
        memcpy(&filebuf[fileindex+33], newname, strlen(newname));
        length += dif;
    /* And, repeat for the companion entry... */
        difptr = &filebuf[fileindex+length+added_length]+
            filebuf[fileindex+length+added_length];
        _fmemmove(difptr+dif, difptr, lastchunk);
        memcpy(&filebuf[fileindex+length+added_length+33],
                    newname, strlen(newname));
    /* Now update all lenght bytes to reflect added data */
        filebuf[fileindex] += dif;
        filebuf[fileindex+length+added_length] += dif;
        filebuf[fileindex + 32] =
            filebuf[fileindex+length+added_length+32] =
                        strlen(newname);
    /* insert 0x00 at the end of file */
        /* in this section, dif is a negative number */
        /* dif is used twice because of the main directory and */
    /* compainion entry        */
        j = filesize + 1 + dif + dif;
        for(i=j;i<=filesize;i++){
            filebuf[i] = 0x00;
        }
    }

/* This section inserts a padding field (0x00) if the    */
/* file name is even. (see section 9.1.12 of iso9660 std. */ if ( (strlen(newname) % 2 ) == 0 ){
        dif = 1;
```

```
difptr = &filebuf[fileindex + 33 +
        strlen(newname)];
lastchunk = (unsigned int) (&filebuf[filesize - dif] -
                                    difptr);
_fmemmove(difptr + dif, difptr, lastchunk);
memcpy(&filebuf[fileindex + 33 + strlen(newname)],
    nullchar, 1);
length += dif;
/* and, for the companion entry... */
difptr = &filebuf[fileindex + length + added_length +
        33 + strlen(newname)];
_fmemmove(difptr + dif,difptr,lastchunk);
memcpy(&filebuf[fileindex + 33 + length + added_length +
        strlen(newname)],nullchar, 1);
/* now update all length bytes to reflect added data */
filebuf[fileindex] = filebuf[fileindex] + 1;
filebuf[fileindex + length + added_length] =
        filebuf[fileindex + length + added_length] + 1;
}

/* Insert some space at end of entry for the new      */
/* system area, update the length bytes of both directory */
/* entries and copy in the new data...            */
/* (We already know that dir length & boundary are even, so */
/* use the standard size for system area)          */ sysSize = 13 + ((fileindex + length + 13) % 2);
if (fileindex + (((length + sysSize) << 1)
        + added_length) > FILE_BUF_SIZE) {
    fprintf(stderr, "* Ran out of space for new directory\n");
        return false;
}
/* bump both lengths */
filebuf[fileindex] = filebuf[fileindex + length + added_length]
        = length + sysSize;
/* Get ptr to sysarea to be */
sysptr = &filebuf[fileindex + length];
lastchunk =
        (unsigned int) ((&filebuf[filesize - sysSize]) - sysptr);
/* Size of tail end */
```

```
/* */
        for(i=0;i<=7;i=i+1){
            sysarea[i+3] = sys_type[index][i];
        }

_fmemmove (sysptr + sysSize, sysptr, lastchunk);
            /* Insert the space   */
            /* Copy in the system info */
        memcpy (sysptr, &sysarea[0], sysSize);
            /* Account for inserted data */
        length += sysSize;
            /* For next entry */
        sysptr = &filebuf[fileindex + length +
                    (length + added_length) - sysSize];
        /* Insert the space */
        _fmemmove (sysptr + sysSize, sysptr, lastchunk);
        /* Copy in the system info */
        memcpy (sysptr, &sysarea[0], sysSize);
/* */
        /* Set associated byte of entry one,    */
/* */
        filebuf[fileindex + 25] = 0x04;

/* if type is APPL set the inited and bundle bits */
            if ( (filebuf[fileindex+length-11] == 0x41) &&
                 (filebuf[fileindex+length-10] == 0x50) &&
                 (filebuf[fileindex+length-9] == 0x50) &&
                 (filebuf[fileindex+length-8] == 0x4C) ){ filebuf[fileindex+length-3] = 0x21;
        } fileindex = fileindex + length + added_length;

/* At this point, the first and second entries have had their names */
        /* replaced and the system area inserted. From previous checks, the */
        /* first entry does not cross the 2048 boundry. Now you must check */
        /* if after all the moving of the first entry will te second entry */
        /* cross athe 2048 boundry. fileindex is pointing to second entry */
        /* length point */
```

```c
for(cur_dir=0x800;cur_dir<=fileindex;cur_dir=cur_dir+0x800);
if(( fileindex + length) >= cur_dir-1){
    dif = cur_dir - fileindex;
    difptr = &filebuf[fileindex];
    lastchunk =
            (unsigned int) (&filebuf[filesize-dif]-difptr);
    _fmemmove(difptr+dif,difptr,lastchunk);
    /* padding end of previous directory with 0x00 */
    for (i=fileindex;i<cur_dir;i++){
            filebuf[i] = 0x00;
    }
    fileindex = cur_dir;
            /* if your at the last CD block and isopc needs more space */
            /* update all values to allow isopc ot continue into the  */
            /* the next cd block                                      */
            /* what if dir_end[?] is not equal to cur_dir    */
            if(dir_end[last_dir_cnt] == cur_dir){
                    if(last_dir_cnt>1){
                            i = dir_end[last_dir_cnt -1];
                    }
                    /* what if last_dir_cnt is equal to 1    */
                    else{
                            i = 0x00;
                    }
                updatecd ( &i );
            } /* end if */
    }
            /* clear corresponding byte of next entry */
            filebuf[fileindex + 25] = 0x00;

if (  (filebuf[fileindex+filebuf[fileindex]-11] == 0x41) &&
          (filebuf[fileindex+filebuf[fileindex]-10] == 0x50) &&
          (filebuf[fileindex+filebuf[fileindex]-9] == 0x50) &&
          (filebuf[fileindex+filebuf[fileindex]-8] == 0x4C)  ){ filebuf[fileindex+filebuf[fileindex]-3] = 0x21;
    } fileindex += filebuf[fileindex];
/*    */
```

```
} /* end if (doxref ..... */
else{
  fileindex += length;
  printf("Pair entry passed : \"%s\"\n",curtext);
  /* no name found in renamer, pair entries not processed */
  /* increment pair_entry_passed */
  pair_entry = pair_entry - 1;
  pair_entry_passed = pair_entry_passed + 1;

}
} /* end if (i>0 && .... */ else{
  /* Get pointers to filenames for both entries &    */
    /* see if 1st 7 chars. match              */
  curptr = &filebuf[fileindex + 33];
  for (i = 0; i < filebuf[fileindex + 32] &&
                          i < 7; i++,curptr++)
  /* Also verify that filename lengths match as well */
  if (i > 0) {

/* single entry found, increment single entry counter */
      sng_entry = sng_entry + 1;

/* Extract the filenames so we can notify user about the match */
      curptr = &filebuf[fileindex + 33];
      for (i = 0; i < filebuf[fileindex + 32]; i++,curptr++) {
         curtext[i] = *curptr;
  }
  curtext[i] = '\0';
    /* clear out added length value */
    added_length = 0;
    /* At this point the length  is > 0, it is not a directory entry */
    /* and does not have a match, So it must be a single entry   */
    /* Cross reference the old names with the 'renamer' */
      /* file and substitute              */
      /* the result.                       */
      /*       printf("curtext= %s",curtext); */
    if (doxref(&curtext[0], newname, &index)) {
        printf("Single entry found : \"%s\" and \"%s\"\n",
``` curtext,newname);

```
/* single entry found, name is in renamer */
/* increment sng_entry_chd */
  sng_entry_chd = sng_entry_chd + 1;

/* cur_dir is the value of the next cd border (2048, 4096..) */
for(cur_dir=0x800;cur_dir<=fileindex;cur_dir=cur_dir+0x800);
   /* get difference of old name and new name */
dif = strlen(newname) - filebuf[fileindex+32];
   /* check if new file entry will extend over the CD border */
   /* dif = dos-mac name, 14 is system size and 1 is for even */
   /* file name lengths                                        */
if((fileindex+length+dif+14+1)>=(cur_dir-1)){
        dif = cur_dir - fileindex;
        difptr = &filebuf[fileindex];
        lastchunk =
             ( unsigned int) (&filebuf[filesize-dif]-difptr);
   _fmemmove(difptr+dif,difptr,lastchunk);
        /* padding end of previous directory with 0x00 */
   for ( i=fileindex;i<cur_dir;i++){
       filebuf[i] = 0x00;
   }
   /* update the new fileindex value */
   fileindex = cur_dir;

/* if your at the last CD block and isopc needs more space */
        /* update all values to allow isopc ot continue into the  */
        /* the next cd block                                      */
   /* what if dir_end[?] is not equal to cur_dir  */
   if(dir_end[last_dir_cnt] == cur_dir){
            if(last_dir_cnt>1){
                 i = dir_end[last_dir_cnt -1];
            }
            /* what if last_dir_cnt is equal to 1    */
            else{
                 i = 0x00;
            }
       updatecd ( &i );
   } /* end if */
} /* end if ((fileindex + length.... */
```

/* */

/* */

```c
    /* if old file name is even, there will be a trailing 0x00 */
    /* leave the trailing 0x00 and adjust the length of the  */
    /* filename so that the 0x00 becomes part of the file name. */
    if( (filebuf[fileindex + 32] % 2) == 0 ){
        filebuf[fileindex + 32] = filebuf[fileindex + 32] + 1;
    }

/* insert new file name     */
    dif = strlen(newname) - filebuf[fileindex + 32];
    if (dif > 0) {
        difptr = &filebuf[fileindex + 33 + dif];
            /* Ptr to excess */
        lastchunk = (unsigned int) (&filebuf[filesize - dif] -
                                                    difptr);
        _fmemmove(difptr + dif, difptr, lastchunk);
        memcpy(&filebuf[fileindex + 33],
        newname, strlen(newname));
        length += dif;
            /* now update the length bytes */
            filebuf[fileindex] += dif;
            filebuf[fileindex + 32 ] = strlen(newname);
    }

/* This new modification allows a file name to be less than */
/* seven characters but greater than or equal to one character. */ else if( (dif>= -15) && (dif<=0) ){
    /* calculate what data to move up   */
        difptr = &filebuf[fileindex] + filebuf[fileindex];
        lastchunk = (unsigned int) (&filebuf[filesize]);
    /* move the data up.       */
        _fmemmove(difptr+dif, difptr, lastchunk);
    /* copy the new file name into place    */
        memcpy(&filebuf[fileindex+33], newname, strlen(newname));
        length += dif;
        filebuf[fileindex] += dif;
        filebuf[fileindex + 32] = strlen(newname);
```

```
    /* insert 0x00 at the end of file */
        /* in this section, dif is a negative number */
        /* dif is used twice because of the main directory and */
    /* compainion entry         */
        j = filesize + 1 + dif + dif;
        for(i=j;i<=filesize;i++){
            filebuf[i] = 0x00;
        }
    }

/* This section inserts a padding field (0x00) if the    */
    /* file name is even. (see section 9.1.12 of iso9660 std. */ if ( (strlen(newname) % 2 ) == 0 ){
      dif = 1;
      difptr = &filebuf[fileindex + 33 +
            strlen(newname)];
      lastchunk = (unsigned int) (&filebuf[filesize - dif] -
                                                difptr);
      _fmemmove(difptr + dif, difptr, lastchunk);
      memcpy(&filebuf[fileindex + 33 + strlen(newname)],
            nullchar, 1);
      length += dif;
        filebuf[fileindex] = filebuf[fileindex] + 1;
    }

/* Insert some space at end of entry for the new       */
    /* system area, update the length bytes of both directory */
    /* entries and copy in the new data...           */
    /* (We already know that dir length & boundary are even, so */
    /* use the standard size for system area)        */
    sysSize = 13 + ((fileindex + length + 13) % 2);
    if ((fileindex + (length + sysSize)) > FILE_BUF_SIZE) {
        fprintf(stderr, "* Ran out of space for new directory\n");
            return false;
    }
        /* bump length */
    filebuf[fileindex] = length + sysSize;
        /* Get ptr to sysarea to be */
```

```c
        sysptr = &filebuf[fileindex + length];
        lastchunk =
                (unsigned int) ((&filebuf[filesize - sysSize]) - sysptr);
            /* Size of tail end */
/* */ for(i=0;i<=7;i=i+1){
            sysarea[i+3] = sys_type[index][i];
        }

_fmemmove (sysptr + sysSize, sysptr, lastchunk);
            /* Insert the space */
            /* Copy in the system info */
        memcpy (sysptr, &sysarea[0], sysSize);
            /* Account for inserted data */
        length += sysSize;
/* hex 0x52 is a R */
        if ( file_type[index][0] == 0x52 ) {
                filebuf[fileindex + 25] = 0x04;
        }
        else if( file_type[index][0] == 0x44) {
                filebuf[fileindex + 25] = 0x00;
        }

/* if type is APPL set the inited and bundle bits */
        if ( (filebuf[fileindex+length-11] == 0x41) &&
             (filebuf[fileindex+length-10] == 0x50) &&
             (filebuf[fileindex+length-9] == 0x50) &&
             (filebuf[fileindex+length-8] == 0x4C) ){ filebuf[fileindex+length-3] = 0x21;
        } fileindex = fileindex + length;
} /* end of if (dox..... */
else{
        fileindex = fileindex + length;
        /* no name found in renamer for single entry */
        /* single entry not processed, increment counter */
        sng_entry_passed = sng_entry_passed + 1;
        sng_entry = sng_entry - 1;
```

```
            printf("Single entry passed : \"%s\"\n",curtext);
          }
        } /* end if ( i > 0 ..... */
      } /* end of else */
    }   /* end while loop */

/* At this point, the new file name and system area have been */
  /* inserted into the correct place. */
  /* This next section shifts the directories back into place */
  fileindex_start = dir_end[last_dir_cnt];
  fileindex = dir_end[last_dir_cnt];
  while(fileindex < dir_end[last_dir_cnt+1]){
      length = filebuf[fileindex];
      if ( ( (filebuf[fileindex+25] & 0x02 ) == 0x02 ) &&
                      (length > 0 ) ){
          dif = fileindex_start - fileindex;
          difptr = &filebuf[fileindex];
          lastchunk = (unsigned int) (&filebuf[filesize]);
          _fmemmove(difptr+dif,difptr,lastchunk);
          j = filesize+ 1 + dif;
          for (k=j; k<=filesize;k++){
             filebuf[k] = 0x00;
          }
              fileindex = dir_end[last_dir_cnt+1];
      }
          else fileindex = fileindex + 1;
  } /* end while loop */ fileindex = dir_end[last_dir_cnt];

/***} end for loop***/
  } /* end for loop */
} /* end fixfile routine */
```

We claim:

1. A system for creating an image for placement onto a CD-ROM disc, said image being in a predetermined format capable of storing first files in a first format for use in a first operating system environment and second files in a second format for use in a second operating system environment, said predetermined format being different than said first format and said second format, said image including directory records, said first files in said first format for use in said first operating system environment and second files in said second format for use in said second operating system environment, said directory records containing predetermined information needed for accessing said first files and said second files, wherein said first files in said first format are incompatible with said second operating system environment and said second files in said second format are incompatible with said first operating system environment and said directory records when in said second format include file name errors and system area errors resulting from incompatibilities between said first operating system environment and said second operating system environment, said system comprising:

a) means for reading said first files, converting said read records to said second format and writing said converted first files onto a storage medium in said second format, wherein said writing creates directory records which are in said second format needed for accessing said first files, which directory records have said file name and system area errors caused by said incompatibilities between said first operating system environment and said second operating system environment;

b) means for reading said second files and writing said read second files onto said storage medium in said second format, wherein said writing creates directory records needed for accessing said second files;

c) means for reading said directory and said first and second files on said storage medium and creating said image for placement on a CD-ROM disc;

d) means for creating a third file containing data necessary to correct said file name and system area errors within said directory records portion of said image introduced by said first file reading, converting and writing means;

e) image correction means for reading said third file and said image and correcting said file name and system area errors in said directory records portion of said image, such that said first operating system is able to correctly access said directory and said first files on said CD-ROM disc.

2. The system defined by claim 1 wherein said file name errors are introduced because said first operating system accepts file names which can have more characters than those accepted by said second operating system.

3. The system defined by claim 2 wherein said system area errors are introduced because said first operating system includes as part of said first file format file fork information and directory information used by said first operating system, said directory information including file creator and file type information for each file in said first file format, said file information being unavailable as part of said second file format used by said second operating system.

4. The system defined by claim 3 wherein said third file includes a table identifying all files from said first operating system with their corresponding complete file names, file creator, file type and file fork information.

5. The system defined by claim 4 wherein said image correction means comprises:

a) means for reading said image as a source file and storing for each said directory record, a directory record length, a file record length, a plurality of file flags, a file name length, said file name and said system area in a first working memory;

b) means for reading said third file and storing its contents in a second working memory;

c) means for matching file names in said first working memory and said second working memory and upon determining that a match exists:
   i) changing the matched file name in said first working memory to the corresponding name in said second working memory;
   ii) changing the system area in said first working memory to include said file creator, said file type and said file fork information in second working memory;

d) means for writing said corrected image to a target file.

6. The system defined by claim 5 wherein said file fork information identifies whether the corresponding file includes one of a data fork, a resource fork, and a data fork and a resource fork.

7. A method for creating an image for placement onto a CD-ROM disc, said image being in a predetermined format capable of storing first files in a first format for use in a first operating system environment and second files in a second format for use in a second operating system environment, said predetermined format being different than said first format and said second format, said image including directory records, said first files in said first format for use in said first operating system environment and second files in said second format for use in said second operating system environment, said directory records containing predetermined information needed for accessing said first files and said second files, wherein said first files in said first format are incompatible with said second operating system environment and said second files in said second format are incompatible with said first operating system environment and said directory records include file name errors and system area errors resulting from incompatibilities between said first operating system environment and said second operating system environment, said method comprising the steps of:

a) reading said first files, converting said read records to said second format and writing said converted first files onto a storage medium in said second format, wherein said writing creates directory records needed for accessing said first files, which directory records have said file name and system area errors caused by said incompatibilities between said first operating system environment and said second operating system environment;

b) reading said second files and writing said read second files onto said storage medium in said second format, wherein said writing creates directory records needed for accessing said second files;

c) reading said directory and said first and second files on said storage medium and creating said image for placement on a CD-ROM disc;

d) creating a third file containing data necessary to correct said file name and system area errors within said directory records portion of said image introduced by said first file reading, converting and writing step;

e) reading said third file and said image and correcting said file name and system area errors in said directory records portion of said image, such that said first operating system is able to correctly access said directory and said first files on said CD-ROM disc.

8. The method defined by claim 7 wherein said file name errors are introduced because said first operating system accepts file names which can have more characters than those accepted by said second operating system.

9. The method defined by claim 8 wherein said system area errors are introduced because said first operating system includes as part of said first file format file fork information and directory information used by said first operating system, said directory information including file creator and file type information for each file in said first file format, said file information being unavailable as part of said second file format used by said second operating system.

10. The method by claim 9 wherein said third file includes a table identifying all files from said first operating system with their corresponding complete file names, file creator, file type and file fork information.

11. The method defined by claim 10 wherein said reading and correcting steps comprise the steps of:
   a) reading said image as a source file and storing for each said directory record, a directory record length, a file record length, a plurality of file flags, a file name length, said file name and said system area in a first working memory;
   b) reading said third file and storing its contents in a second working memory;
   c) matching file names in said first working memory and said second working memory and upon determining that a match exists:
      i) changing the matched file name in said first working memory to the corresponding name in said second working memory;
      ii) changing the system area in said first working memory to include said file creator, said file type and said file fork information in said second working memory;
   d) writing said corrected image to a target file.

12. The method defined by claim 11 wherein said file fork information identifies whether the corresponding file includes one of a data fork, a resource fork, and a data fork and a resource fork.

* * * * *